INVENTOR
CARL E. HUMES

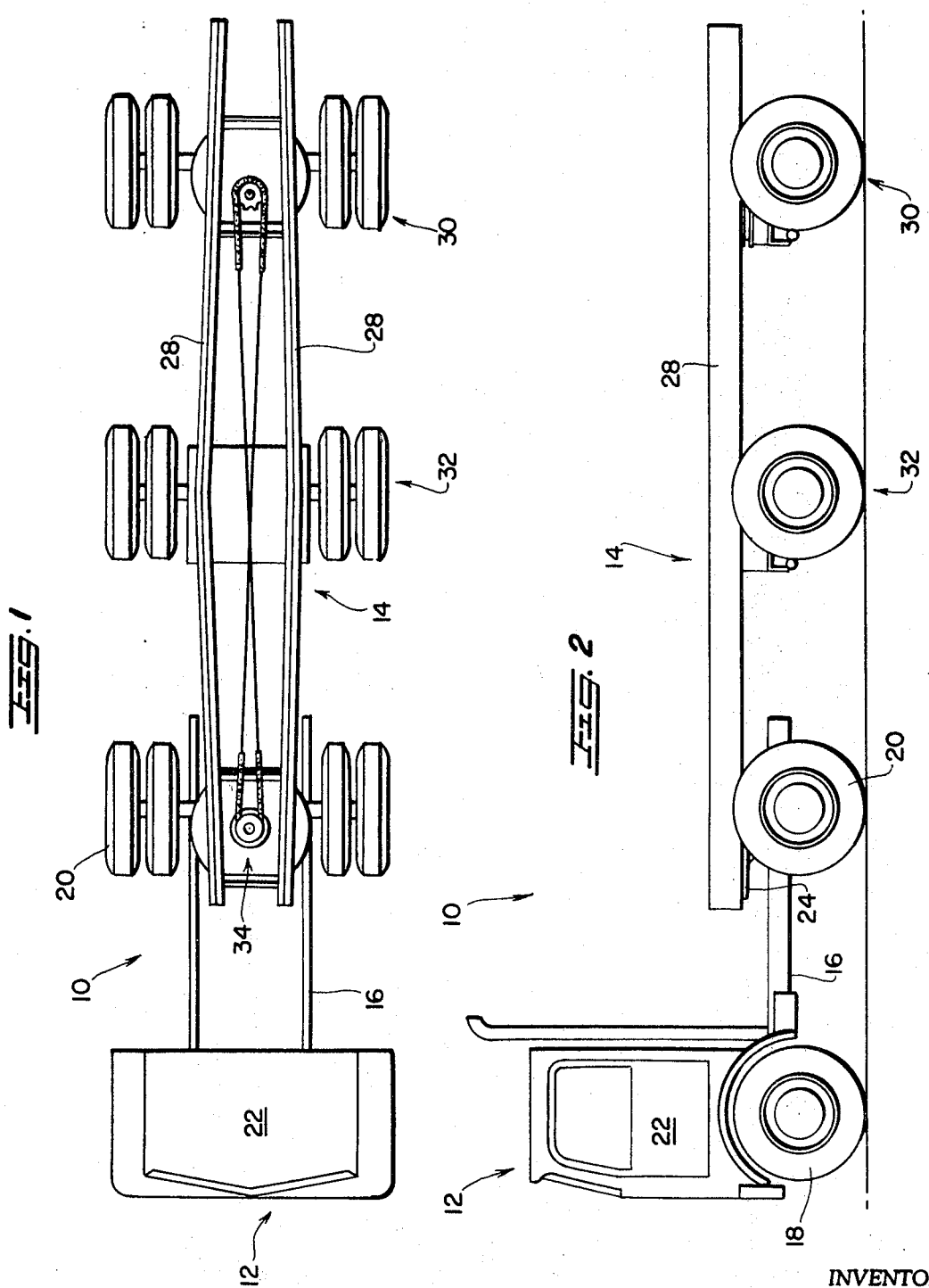

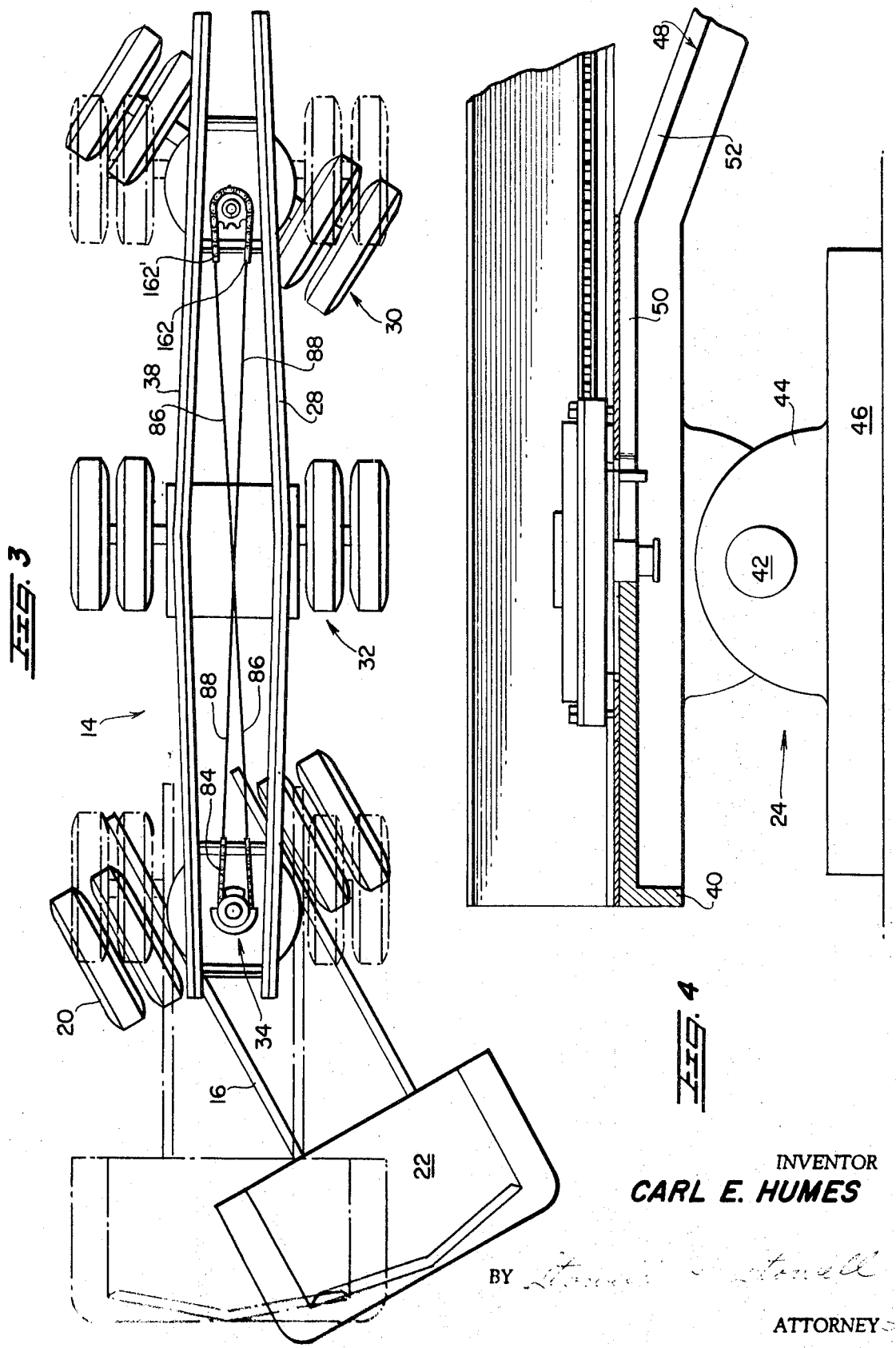

BY *Stowell & Stowell*

ATTORNEYS

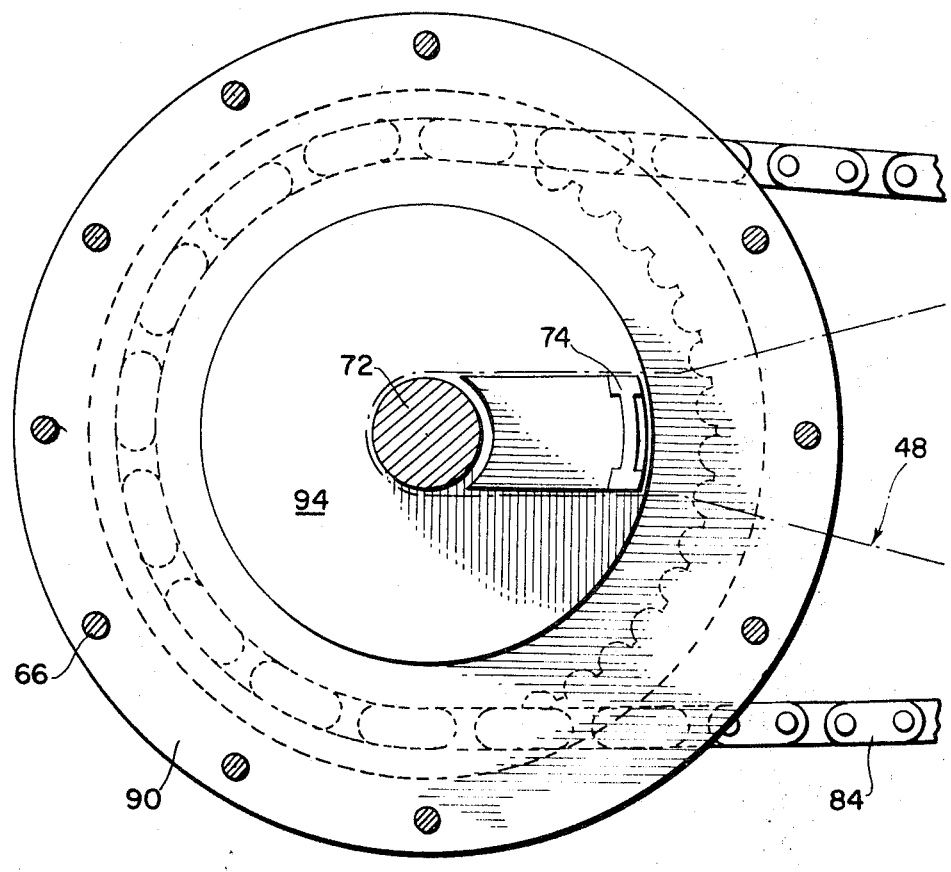
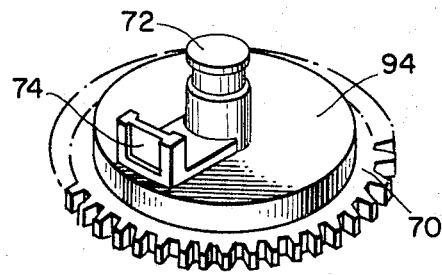
INVENTOR
CARL E. HUMES
BY *Stowell & Stowell*
ATTORNEYS

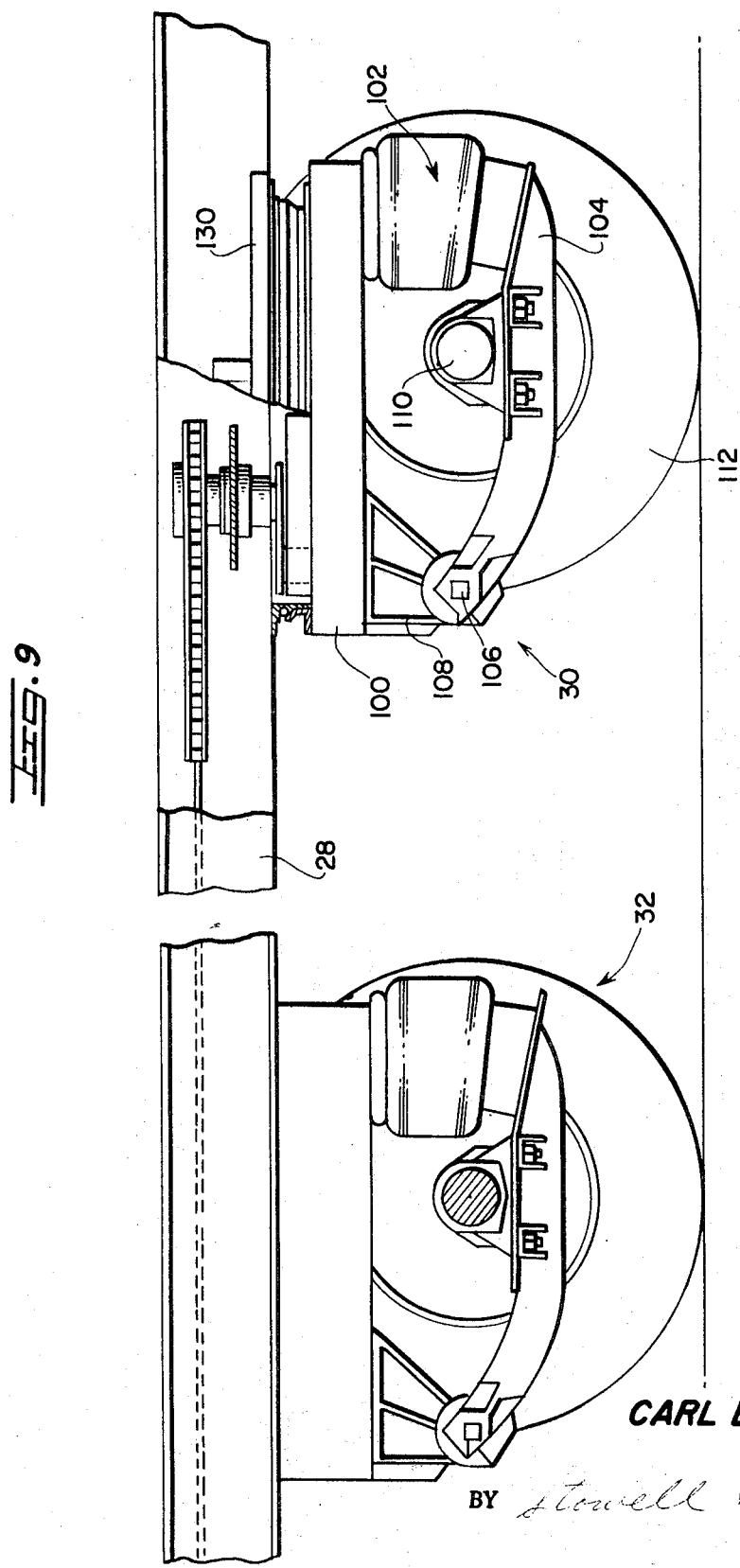

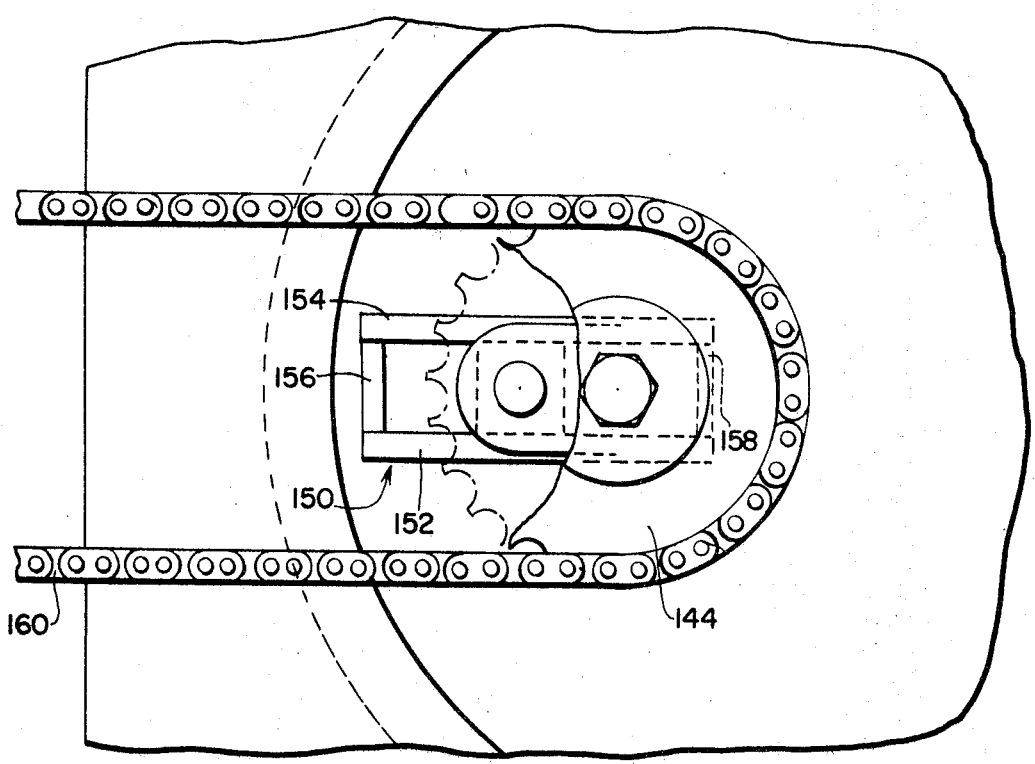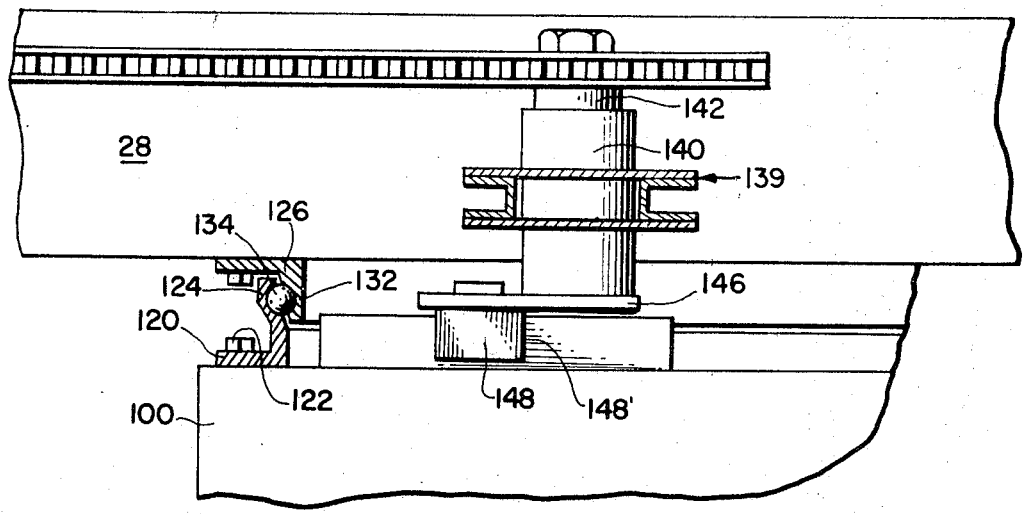

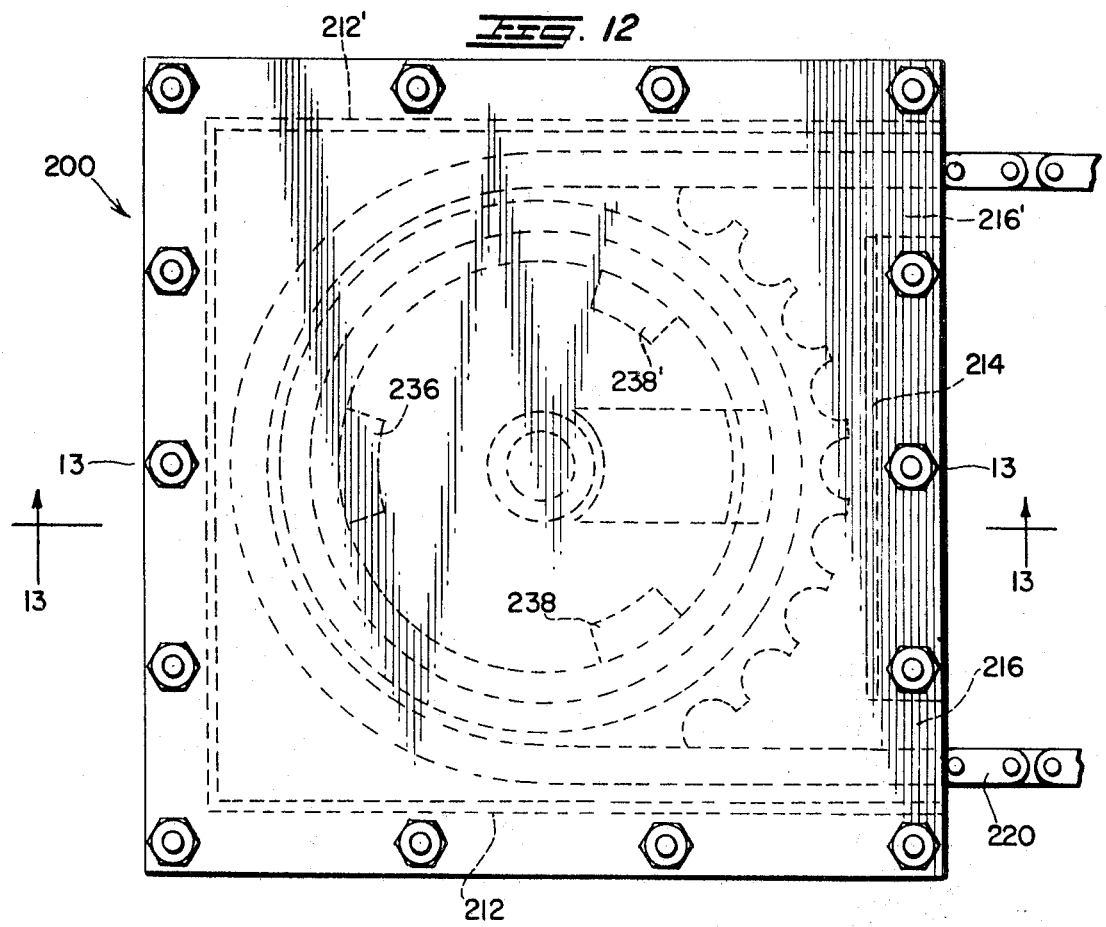
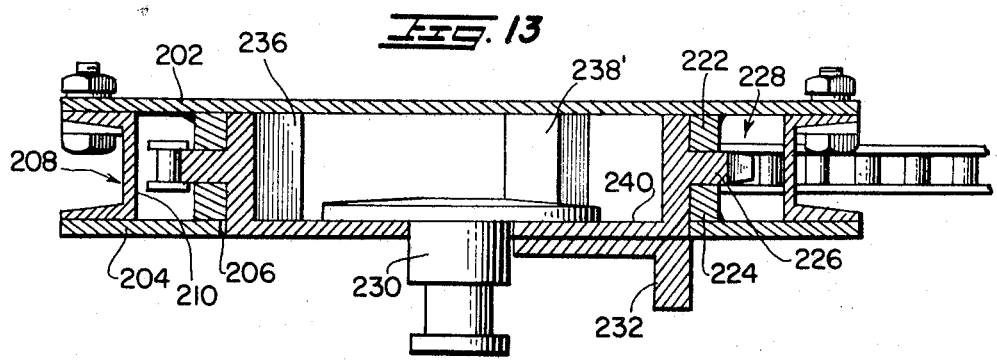

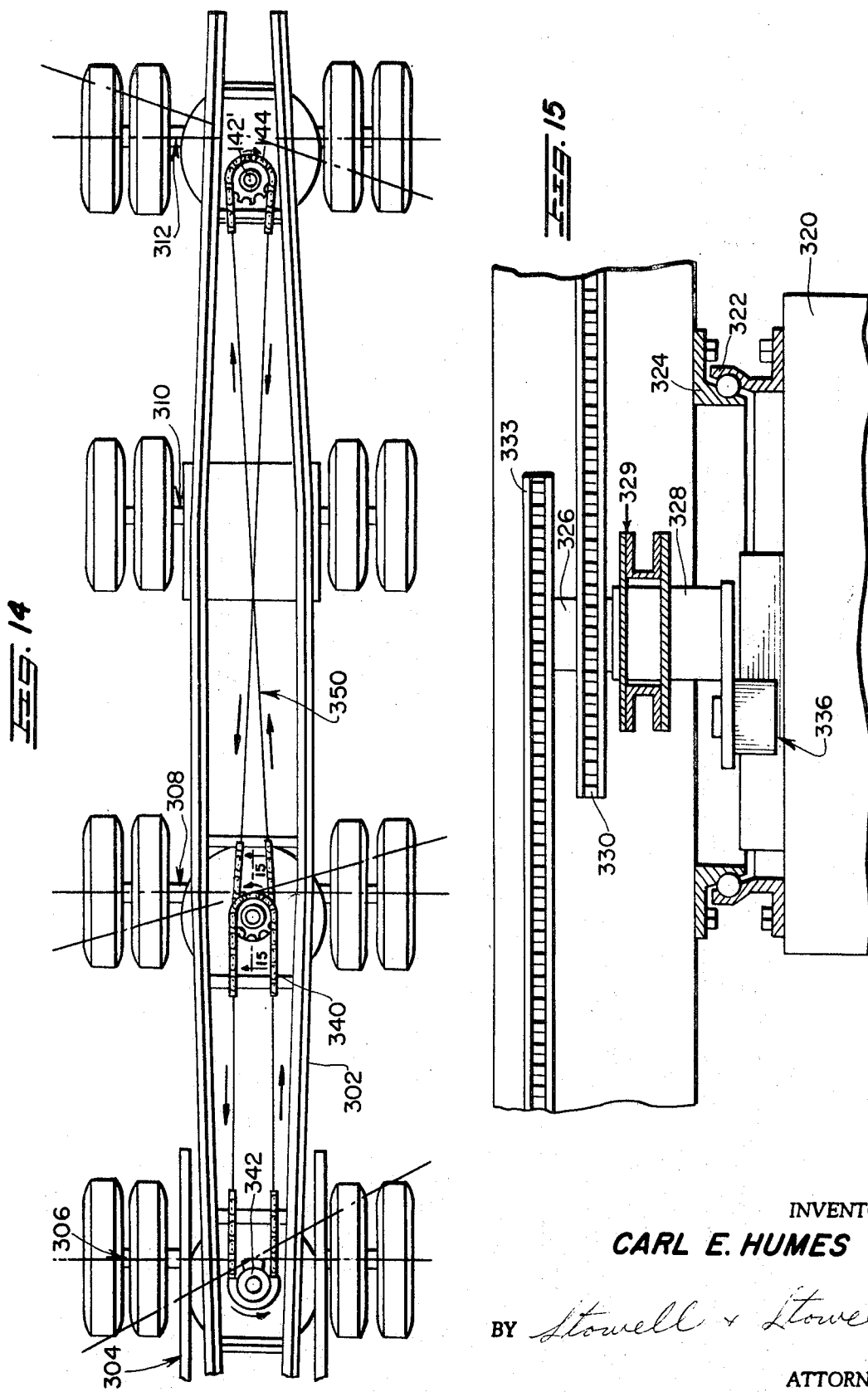

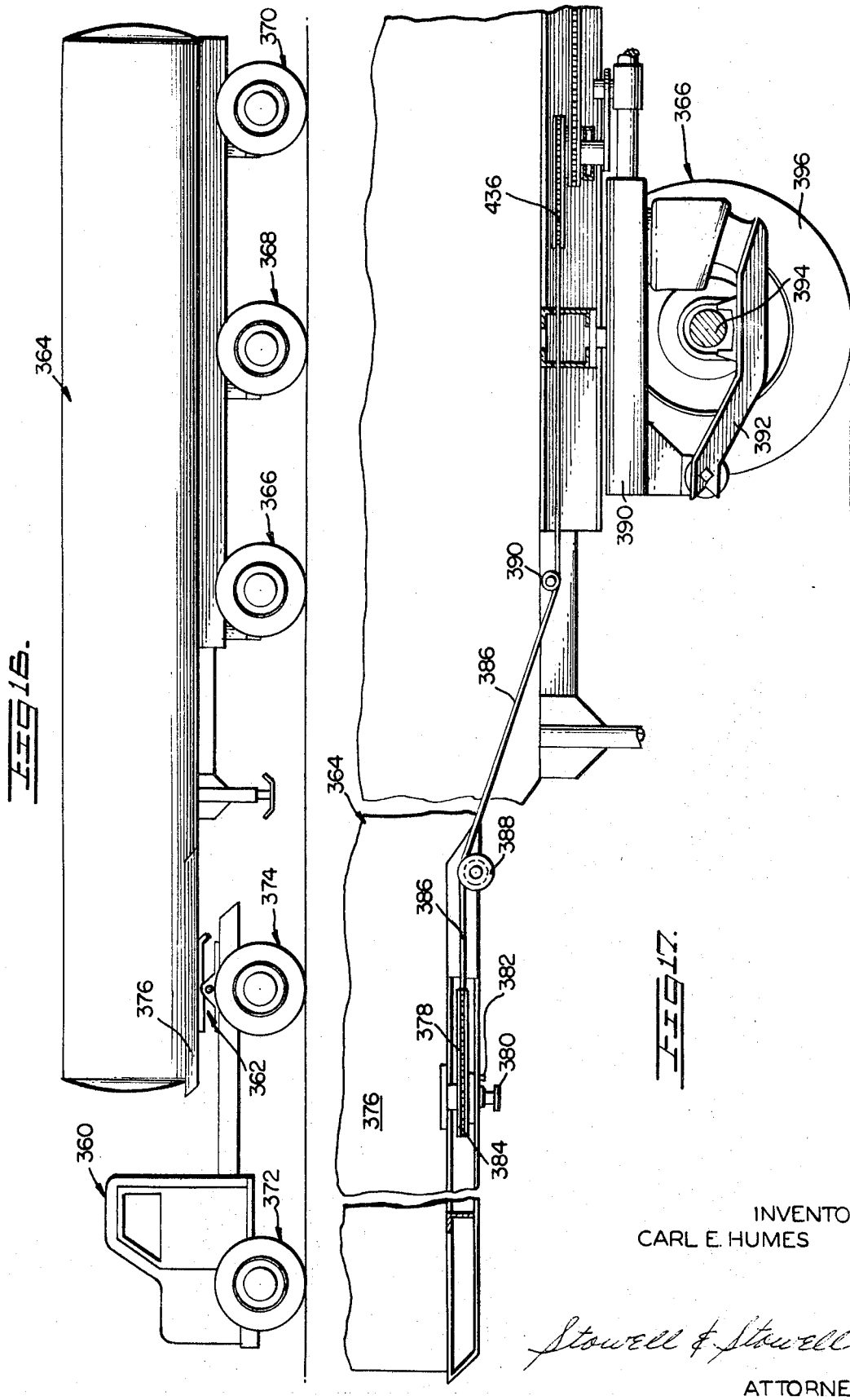

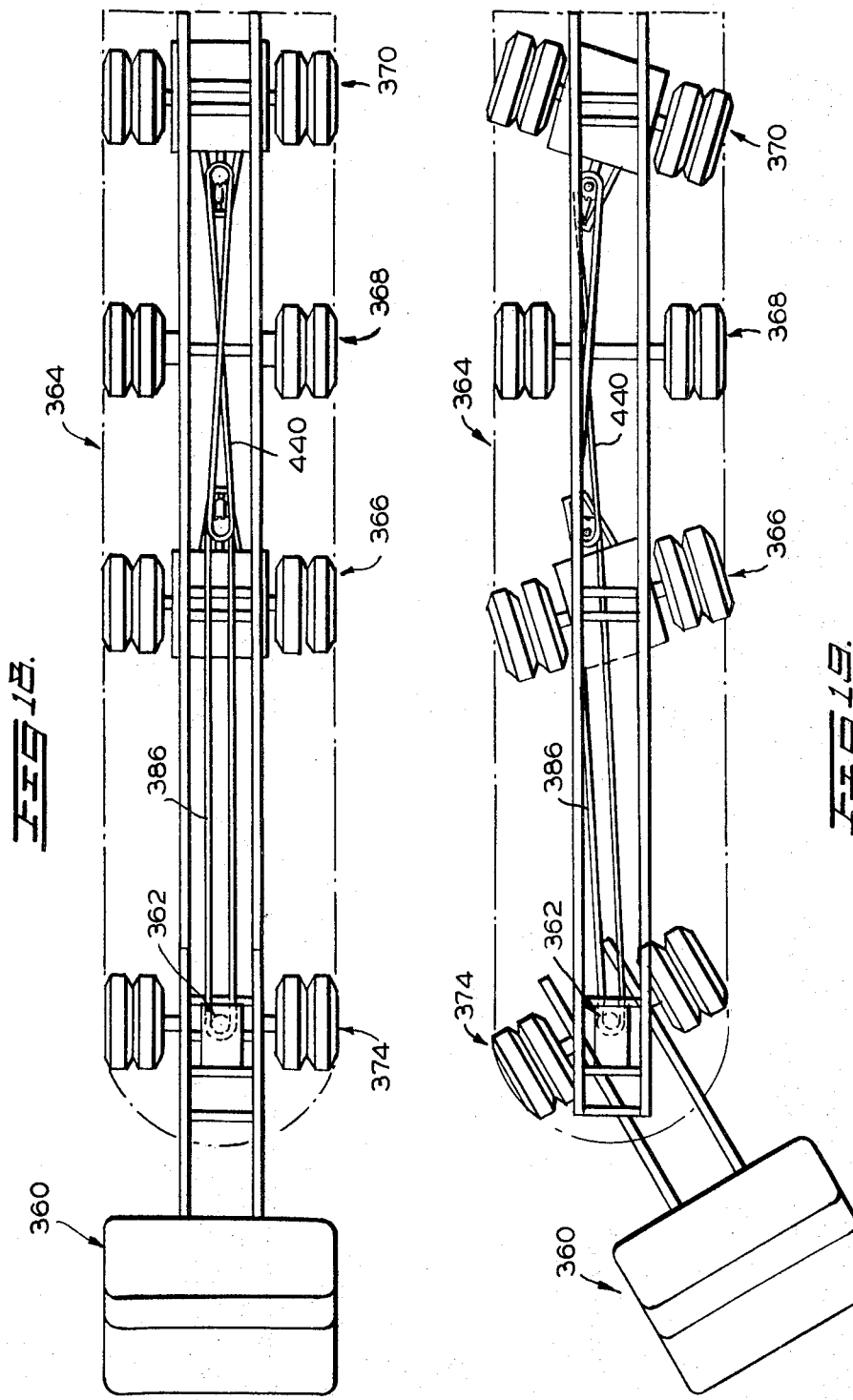

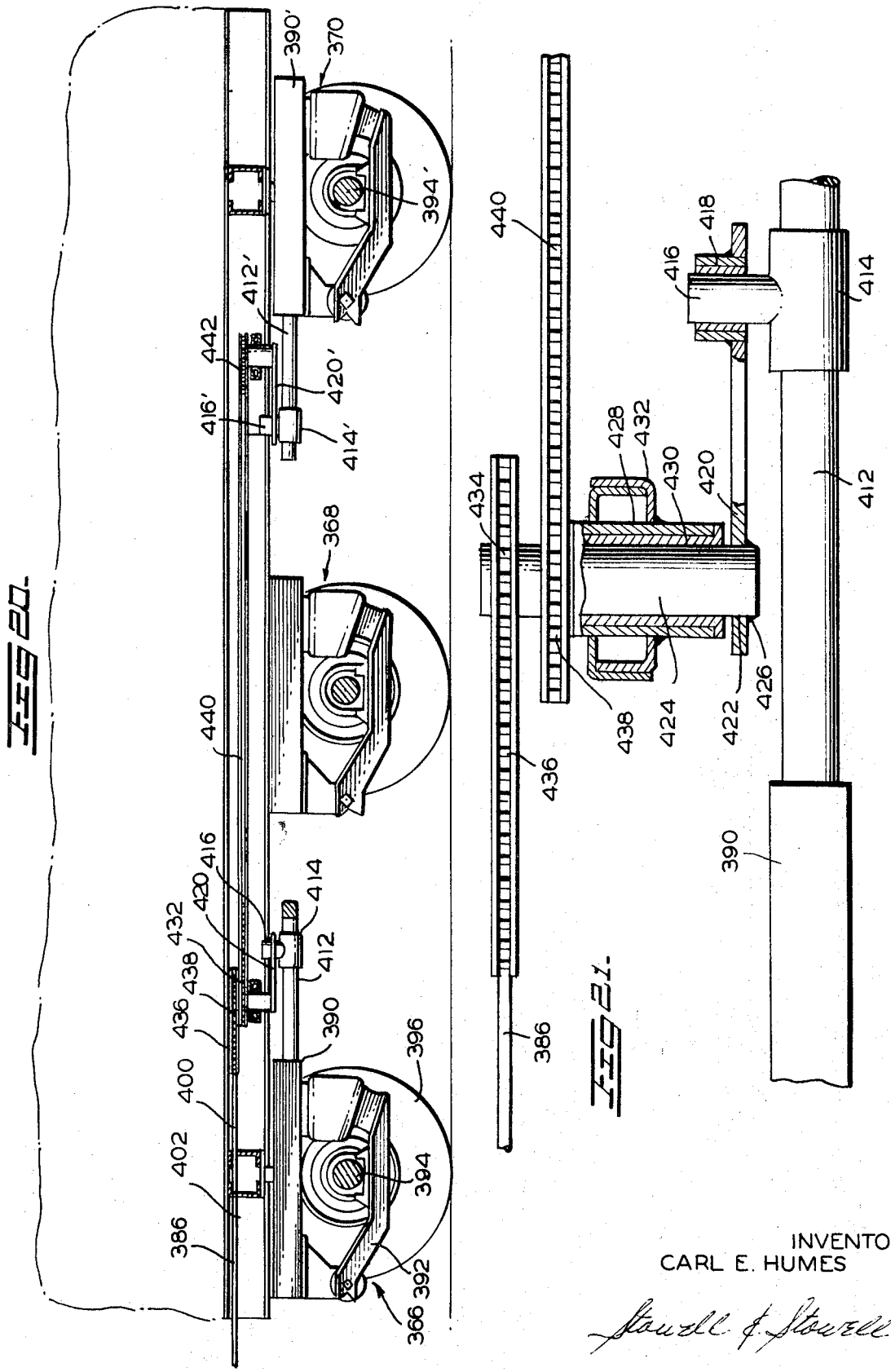

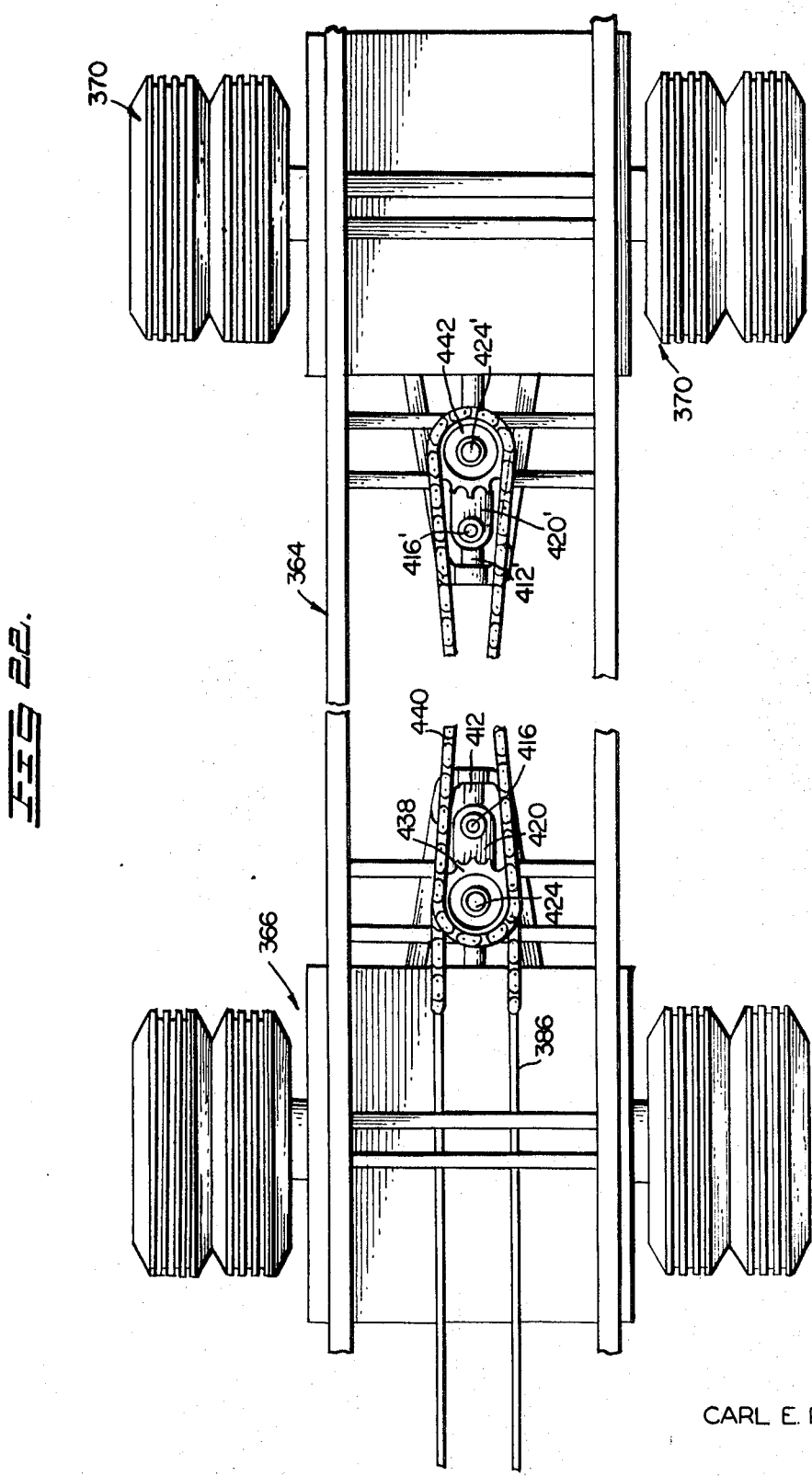

Oct. 13, 1970   C. E. HUMES   3,533,644
STEERING ASSEMBLY FOR TRAILERS
Filed Feb. 24, 1969   15 Sheets-Sheet 13
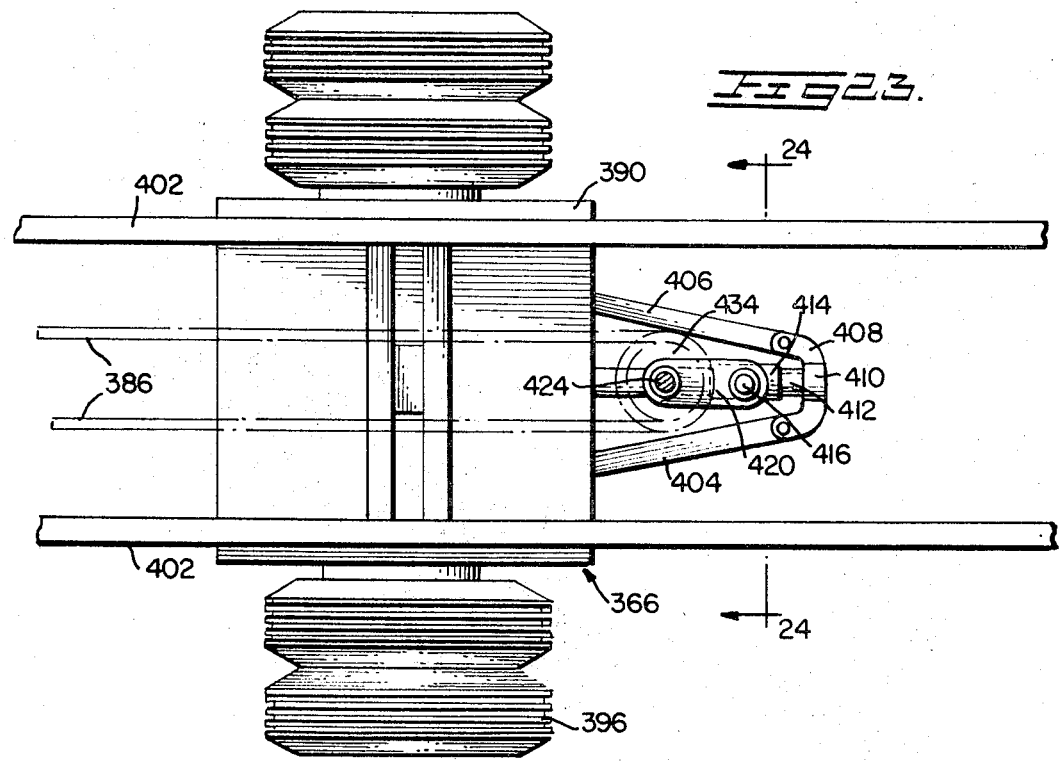
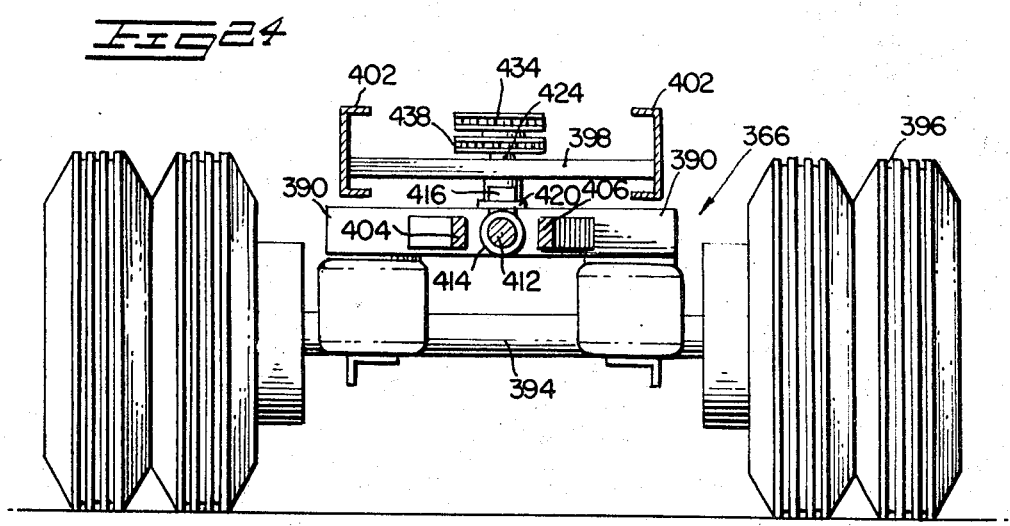
INVENTOR
CARL E. HUMES
ATTORNEYS

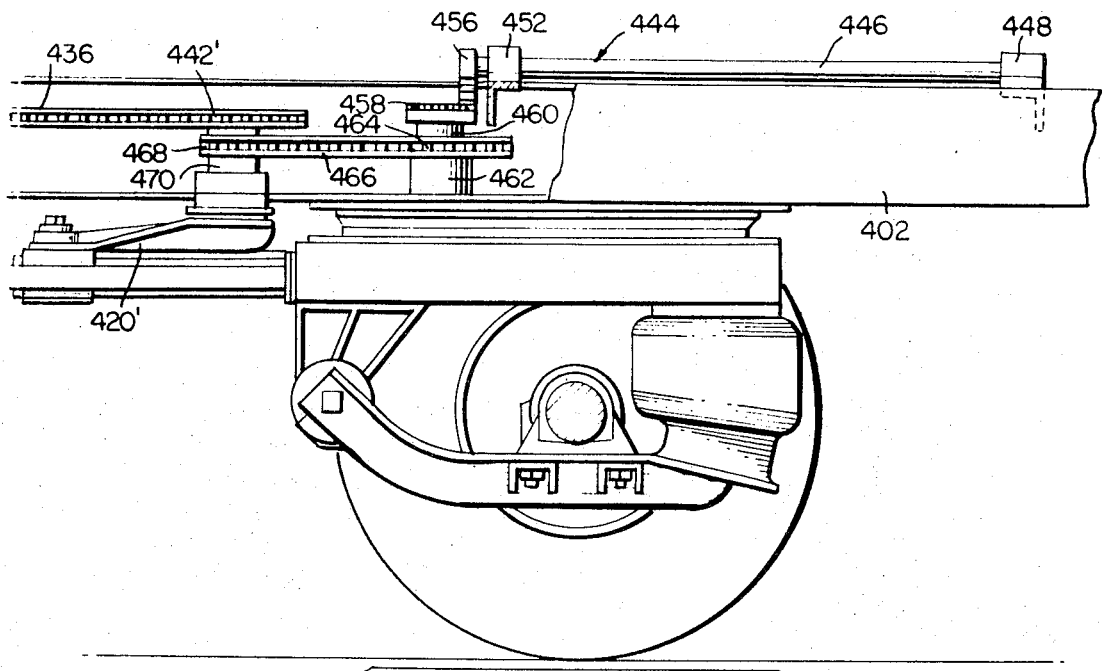
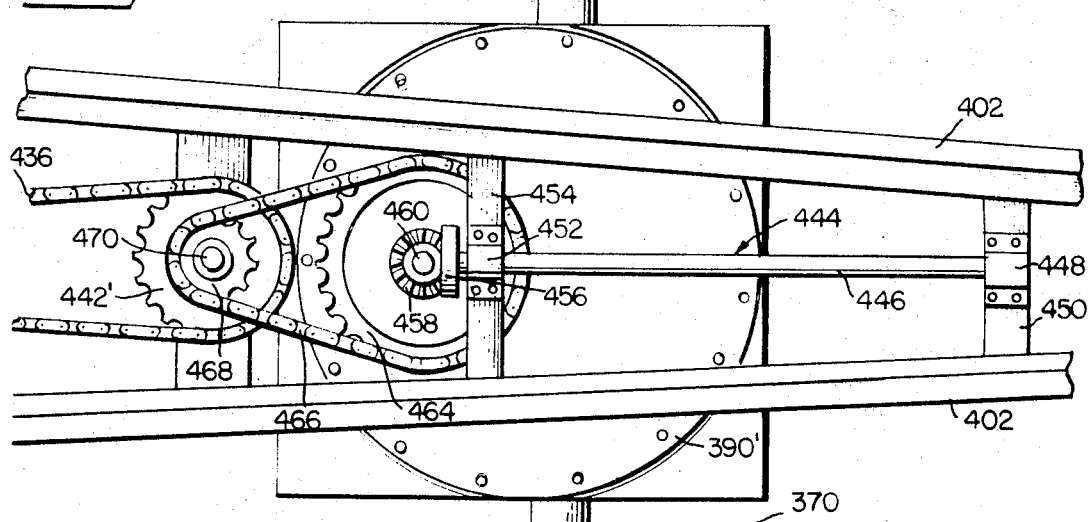

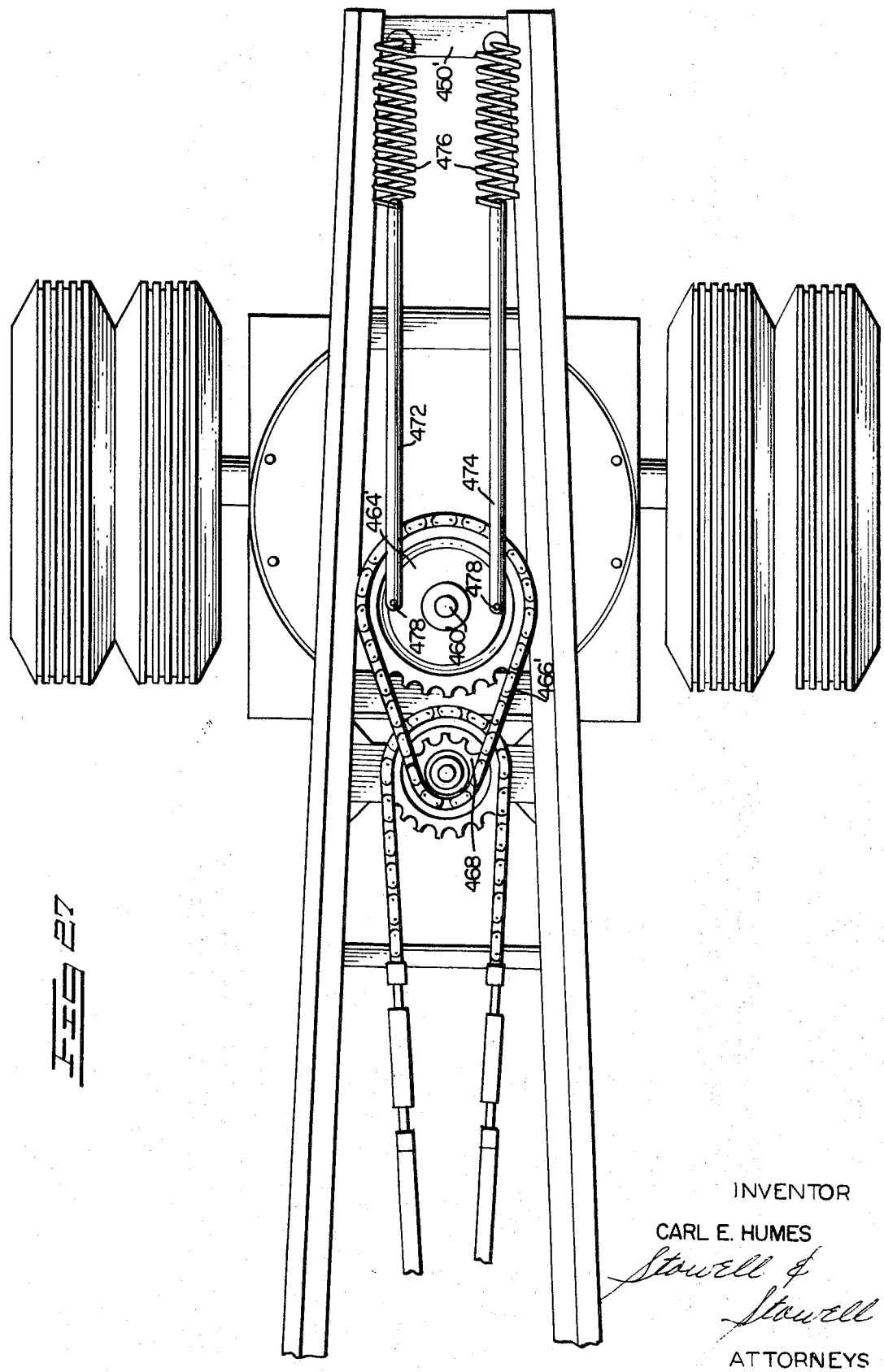

United States Patent Office 3,533,644
Patented Oct. 13, 1970

3,533,644
STEERING ASSEMBLY FOR TRAILERS
Carl E. Humes, 907 Franklin Ave.,
Steubenville, Ohio 43952
Continuation-in-part of application Ser. No. 655,136,
July 21, 1967. This application Feb. 24, 1969, Ser.
No. 805,980
Int. Cl. B62d 53/06
U.S. Cl. 280—426                                    9 Claims

ABSTRACT OF THE DISCLOSURE

An improved steering mechanism for a tractor driven plural wheeled trailer wherein the motive force for steering the trailer positively extends from the fifth wheel of the tractor in the form of chain and sprocket connections to a turntable supporting assembly structurally associated with one or several steerable axle assemblies supporting the trailer with means being provided for varying and limiting the degree of turning movement of each turntable assembly so that, in the latter respect, jackknifing of the tractor-trailer combination is prevented and self centering means is associated with the rearwardmost steerable axle assembly for action directly thereon and therethrough on the forward steerable axle assemblies to maintain all of the steerable axle assemblies in normal centered positions.

CROSS-REFERENCE TO RELATED APPLICATION

This application is a continuation-in-part applicaiton of application Ser. No. 655,136, fiiled July 21, 1967, entitled "Steering Assembly For Trailers," which is now abandoned.

BACKGROUND OF THE INVENTION

Field of the invention

This invention generally appertains to improvements in tractor-trailer assemblies and more particularly relates to new and novel improvements in steering assemblies for trailers whereby the steerable wheeled axle assembles of a trailer are positively steered by the movements of the towing tractor.

Description of the prior art

My prior patent, No. 3,195,922, issued July 20, 1965, is exemplary of the state of the prior art in that it shows the front end of a trailer pivotally connected by a king pin to the fifth wheel of a tractor with the fifth wheel including a rearwardly opening king pin receiving slot and the rearward end of the trailer supported on pivotally mounted steerable wheeled axle assemblies. The steerable axle assemblies are connected to the fifth wheel of the tractor by chain and sprocket connections whereby turning of the tractor fifth wheel is translated into cooperative turning movement of the wheeled steerable axle assemblies of the trailer with such turning of the trailer steerable axle assemblies being predetermined and varying from a maximum at the beginning of a turn and decreasing as the tractor's degree of turn increases.

SUMMARY OF THE INVENTION

The present invention constitutes new and novel improvements over the disclosed construction and assembly in the foregoing patent.

It is a principal object of the present invention to provide an improved steering assembly for trailers including means for cooperatively steering wheeled axle assemblies of trailers adapted to be towed by tractors.

It is an object of the present invention to provide such an improved steering mechanism which may be readily applied to trailers having two, three, four or more wheeled axles and various combinations of the wheeled axles may be steered cooperatively to substantially eliminate sliding or dragging motion between the wheels of the trailer and the roadway.

It is another object of the present invention to provide such a system wherein anti-jackknife means are built into the steering assembly to thereby limit the relative pivotal motion between the tractor and the trailer It is another important object of the present invention to provide such cooperative steering mechanisms wherein certain of the wheeled axles may be moved in one direction, others in the opposite direction and the degree of movement of each of the plural axles of the trailer may be readily controlled and varied merely by changing the gear ratio of sprockets which comprise the main drive means for the cooperative steering mechanism.

Another important object of the present invention is to provide such cooperative steering mechanisms for tractor pulled trailers wherein the motive force for operating the steering mechanism is positively obtained from the fifth wheel of the tractor.

Another object of the invention is to provide improved cooperative steering means for tractor hauled trailers that is relatively simple in construction, rugged and relatively inexpensive to install and maintain.

A still further object of the present invention is to provide slidably arranged means structurally associated with the rotatable supporting turntable for each steerable axle assembly for limiting the degree of turning movement of the turntables and the associated steerable axle assemblies so that jackknifing of the tractor-trailer combination is prevented.

A still further object of the present invention is to provide a self centering arrangement connected directly between the rear of the trailer frame and the rearwardmost steerable axle assembly for directly acting thereon and acting therethrough on the forwardly disposed steerable axle assemblies to maintain all of the steerable axle assemblies in normal centered positions relative to the trailer frame with such self centering arrangement functioning in an automatic fashion.

These and other objects and advantages are generally provided in a multiple wheeled tractor-trailer assembly wherein the front end of the trailer is pivotally connected by a king pin to a fifth wheel supported by the tractor and the tractor fifth wheel is of the type which has a generally V-shaped rearwardly opening king pin receiving slot, at least one wheeled axle assembly for the trailer, means mounting the wheeled axle assembly for controlled pivotal movement relative to the trailer main frame, said mounting means including a vertical shaft mounted on the trailer frame for rotation relative thereto, a first sprocket secured to rotate with the shaft, a crank secured to rotate with the shaft, a slide arrangement secured to the wheeled axle assembly and adapted to receive the extended end of the crank, a king pin carried at the forward end of the trailer, a second sprocket mounted concentric to the king pin, a depending arm secured to the second sprocket eccentric to the king pin and adapted to be snuggly received in the fifth wheel slot rearwardly of the king pin, and cable and chain means drivably interconnecting the first and second sprockets.

The invention will be more particularly described in reference to the accompanying drawings wherein:

FIG. 1 is a top plan view of a tractor-trailer assembly wherein the trailer includes a first fixed set of wheels and a steerable wheel axle assembly;

FIG. 2 is a side elevational view of the structure illustrated in FIG. 1;

FIG. 3 is a view similar to that shown in FIG. 1 with the rear steerable wheeled axle assembly pivoted correspondingly to the trcator for the trailer;

FIG. 4 is an enlarged fragmentary partial sectional view of the connecting means between the fifth wheel of the tractor and the front end of the trailer;

FIG. 7 is the bottom plan view of the structures shown in FIGS. 4, 5 and 6;

FIG. 8 is a perspective view of the sprocket, king pin and crank arm assembly from the structures shown in FIGS. 4 through 7;

FIG. 9 is an enlarged fragmentary view of the steering control mechanism for the rear wheeled axle assembly of the vehicle illustrated in FIG. 1;

FIG. 10 is a fragmentary enlarged top plan view of the structures shown in FIG. 9;

FIG. 11 is a fragmentary partial elevational view of the structures shown in FIG. 10;

FIG. 12 is a top plan view of a modified form of steering control means and king pin assembly of the present invention;

FIG. 13 is a section on line 13—13 of FIG. 12;

FIG. 14 is a diagrammatic top plan view similar to FIG. 1 of a trailer including two sterable wheeled axle assemblies and one fixed wheeled axle assembly;

FIG. 15 is a fragmentary enlarged partial vertical sectional view substantially on line 15—15 of FIG. 14.

FIG. 16 is a side elevational view of a tractor-tanker trailer combination with the steerable axle assemblies of the trailer having a modified form of steering control means;

FIG. 17 is an enlarged fragmentary longitudinal vertical sectional of the front wheel assembly of the trailer and the connecting means carried by the front of the trailer of FIG. 16 for connection to the fifth wheel of the tractor of FIG. 16 in a similar manner as the connection means shown in FIG. 4;

FIG. 18 is a diagrammatic top plan view of the tractor-trailer combination of FIG. 16 and illustrates the steerable wheeled axle assemblies of the trailer in straight line tracking relation with the rear drive wheels of the tractor;

FIG. 19 is a view similar to FIG. 18 but showing the steerable wheeled axle assemblies pivoted in correspondence to the turning position of the towing tractor;

FIG. 20 is an enlarged detailed elevational view of the steering control connection means between the front and the rear steerable axle assemblies;

FIG. 21 is a fragmentary detailed view, partly in section, of the steering control mechanism connected directly to the front steerable axle assembly, the control mechanism being the same for the rear steerable axle assembly, as shown in FIG. 20;

FIG. 22 is an enlarged bottom plan view of the front and rear steerable axle assemblies showing the steering control mechanisms for each one and the interconnecting assembly therebetween;

FIG. 23 is an enlarged bottom plan view of the steering control mechanism for one of the steerable axle assemblies of FIG. 22;

FIG. 24 is a vertical cross-sectional view taken substantially on line 24—24 of FIG. 23;

FIG. 25 is an enlarged side elevational view, partly in section, of the rearwardmost steerable axle assembly illustrating a self centering device in the form of a longitudinally arranged torsion bar connected between the turntable assembly of the axle assembly and the rear of the trailer frame;

FIG. 26 is a detailed bottom plan view of the torsion bar structure shown in FIG. 25;

FIG. 27 is a bottom plan view of another form of self centering arrangement, such including equalizer bars connected between the turntable assembly of the rearwardmost steerable axle assembly and the rear of the trailer frame.

DESCRIPTION OF THE PREFERRED EMBODIMENTS

Figure 5:
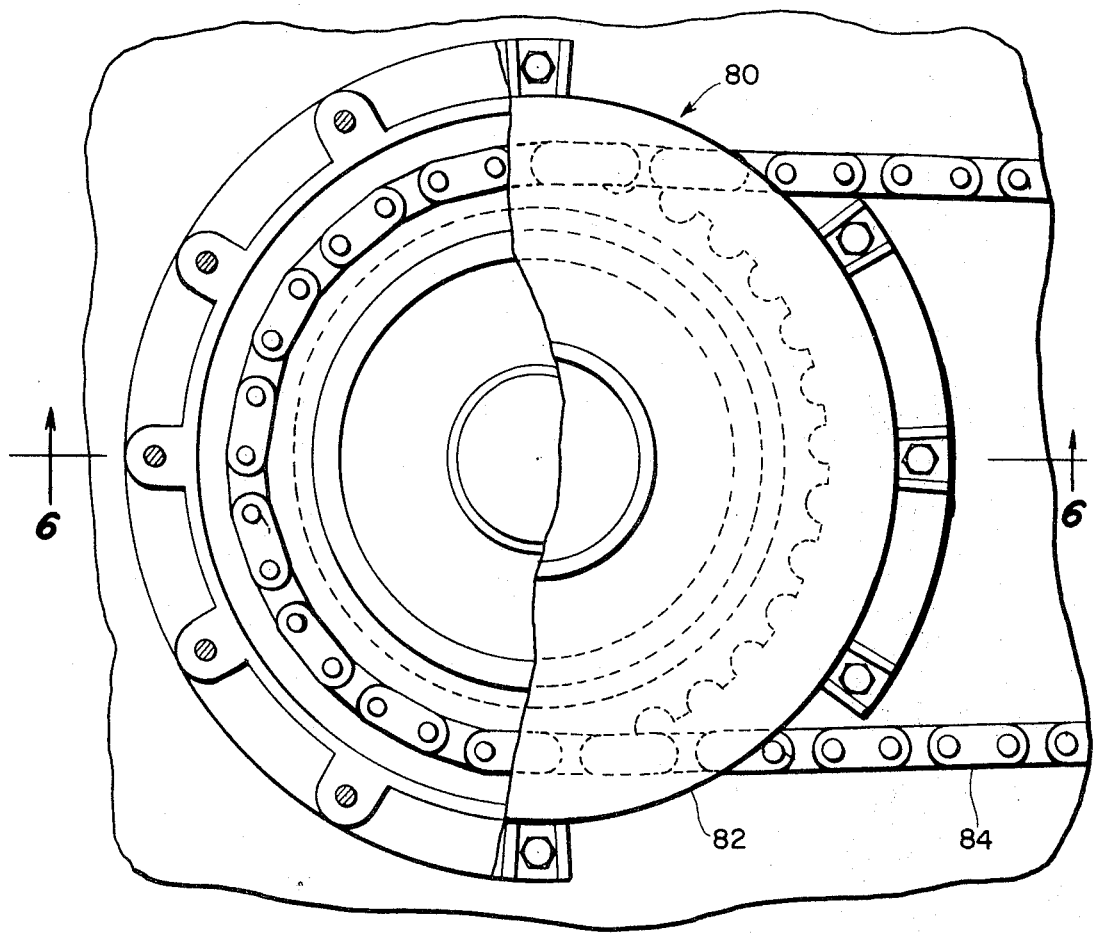
FIG. 5 is a fragmentary top plan view of the structures illustrated in FIG. 4.

Referring to the drawings and initially to FIGS. 1 through 3, there is illustrated a tractor-trailer assembly generally designated 10. The tractor trailer assembly includes a towing tractor 12 and a trailer 14.

The towing tractor 12 is of conventional design and includes a chassis or frame 16 having steerable front wheel assemblies 18 and non-steerable drive wheel assemblies 20. The tractor also includes a cab 22 and a conventional fifth wheel assembly 24 providing the means for supporting the forward end of the trailer 14.

The trailer 14 generally includes a bed supported on frame members 28, which frame members are supported at the rear end by a wheeled axle assembly generally designated 30 and a further wheeled axle assembly 32 positioned intermedite the rear wheeled axle assembly 30 and the front end of the trailer. The trailer also includes means 34 for connecting the trailer to the fifth wheel 24 of the tractor.

Referring particularly to FIGS. 4, 5, 6 and 7, the tractor fifth wheel assembly 24 includes the fifth wheel platform 40 which is pivotally mounted for limited tilting movement on a pin 42 mounted to a boss 44 secured to a member 46 mounted to the tractor frame 16. The fifth wheel assembly is provided with a rearwardly extending slot generally designated 48 which slot includes a straight portion 50 and an outwardly and rearwardly tapered portion 52. The platform 40 of the fifth wheel assembly 24 includes downwardly curved portions 54 and 54' adjacent the tapered portion of the slot 52.

Adjacent the forward end of the trailer is mounted a cast two-piece housing generally designated 60. The housing includes an upper member 62 and a lower member 64. The pair of cast members when attached by bolts 66 form the housing 60 which houses a combination cast sprocket, king pin and drive dog assembly generally designated by the numeral 68. The sprocket of the assembly 68 is designated 70, the king pin 72 and the depending drive arm or dog 74. The outer cylindrical surface 76 of the cast assembly 68 has bearing engagement with the inner cylindrical surface formed by the pair of cast members 62 and 64 with the sprocket portions projecting through a cylindrical opening 78 formed between the pair of cast members. The cast members are open at 80 and 82, as more clearly shown in, for example, FIG. 5, to accomodate the reaches of a drive chain 84 so it can feed about the sprocket 70 then rearwardly as more clearly shown in, for example, FIGS. 2 and 3. The rearward ends of the chain 84 may be connected to elongated steel ribbons or rods 86 and 88 as to be more fully described hereinafter.

The cast members 62 and 64 are, as hereinbefore described, maintained in their assembled relationship by a plurality of bolts 66 which bolts are threadedly received in a plate member 90 forming a box-like housing beneath the forward end of the trailer. The housing 90 has an opening 92 therein through which projects the lower portion 94 of the cast assembly 68. The depending arm 74 is received in the relatively straight portion 50 of the fifth wheel slot 48 whereby upon rotation or pivotal movement of the fifth wheel 40 the arm 74 is likewise moved, rotating the casting 68 in the housing assembly 60, which in turn causes the chain 84 trained about the sprocket teeth 70 to move in a corresponding direction.

Now referring paticularly to FIGS. 9, 10 and 11 the rear axle assembly includes a platform 100, which platform carries conventional air bag-type suspension means 102 connected at one end of each of the arms 104 while the other ends of each of the arms 104 are keyed to a torque red 106 which in turn is supported from depending brackets means 108 welded or bolted to the platform 100. Between the torque shaft 106 and the air suspending means 102 is the axel 110 which rotatably supports the plural wheels 112. In the illustrated from of the invention the platform 100 carries only a single axel 110. It will be recognized by those skilled in the art that the platform 100 could support dual axles where greater load carrying capacities ae desired of the trailer.

The upper surface of the platform 100 has secured therein a cast or machined ring 120. The ring 120 is connected to the top surface of platform 100 by a plurality of bolts 122 and the upper surface of the ring 120 is provided with a bearing race 124. The under surface of frame members 28 carry a coopeating bearing ring member 126. The ring member 126 is bolted to a box or plate member 130 carried by the frame as more clearly shown in FIG. 9 of the drawings. The ring member 126 has a bearing race 132 which bearing race, in cooperation with bearing race 124, receives a plurality of spherical bearings 134 to thereby support the axle assembly 30 for rotation relative to the main frame members 28. This form of construction eliminates the need for a king pin for the rear axle assembly and materially simplifies construction and support of the steerable assembly.

Rotatably mounted above the steerable rear axle assembly and supported by cross frame means 139 extending between the spaced parallel trailer main frame members 28 is a vertically disposed bushing or sleeve 140 which rotatably carries a vertical shaft 142. The upper end of shaft 142 has secured thereto a toothed sprocket 144 while the lower end of the shaft 142 has secured thereto an arm 146 which arm carries at its extended end a slide block 148. The slide block is received in a slide generally designated by the numeral 150 secured to the upper surface of the platform 100. The slide 150 includes a pair of longitudinal side members 152, 154 and transverse end members 156 and 158, as more clearly shown in FIG. 10 of the drawings.

The transverse spacing between the side members 152 and 154 of the slide 150 is such that the block 148 is snuggly received therein, while the spacing between the end members 156 and 158 may be such that when the wheels 112 are running normal to the frame 28 of the trailer the slide block may be in contact with the stop member 156 while the other end 148′ of the slide block may come into contact with end plate 158 when the wheeled axle 110 is turned relative to the main frame of the trailer in the maximum desired turning ratio. Thus, cooperation between the slide block 148 and the slide 150 provides means to prevent overcontrolling of the rear axle 110 and thus acts as an antijackknife device for the tractor-trailer combination. It will be noted that in FIGS. 10 and 11 the end plates 156 and 158 are spaced from the slide block 148 a distance greater than the slide block would normally move.

The sprocket 144 is turned so as to turn the rear axle 110, by a chain 160 which chain has its ends 162 and 162′, as shown in FIG. 3, connected to the rearward ends of the steel bands 86 and 88 respectively, that is, in reverse manner to the connection of the bands to the forward chain 84 whereby the rear wheel assembly 30 pivots in the opposite direction to the fixed wheels 20 of the tractor as illustrated in FIG. 3 of the drawings, such that the point of pivot of the trailer 14 is about the wheeled axle assembly 32. This motion in the rear axle assembly 30 relative to the tractor rear wheels 20 is brought about by crossing the steel bands 86 and 88 as illustrated.

The ratio of pivotal movement of the steerable axle assembly 30, may be determined and may be varied by varying the ratio between the sprocket 70, at the front end, and the sprocket 144 at the rearward end. It will be appreciated that the length of the lever arm 146 will also determine the amount of steering provided in the steerable axle assembly and it has been found to be more convenient to regulate the desired degree of steering by changing the length of the lever arm 146 and its slide block in the slideway 150 than changing the sprocket ratio.

Further, it will be appreciated that the connection between the pair of chains 84 and 160 at the forward and rearward ends of the trailer and the steel webs or bands 86 and 88 may be adjustable by means of turn buckles and the like so that the tension in the chains and the steel webs may be readily adjusted so as to accommodate for changes in the ratio of the pair of sprockets 70 and 144.

Referring particularly to FIGS. 12 and 13, there is shown a further form of steering mechanism adapted to be received adjacent the forward end of the trailer. In FIGS. 12 and 13, the front control mechanism 200 comprises a top plate 202, a bottom plate 204 having a circular opening 206 cut or formed therein and a spacer 208. The spacer 208 is made up of a rear element 210, a pair of side elements 212 and 212′ and a front element 214. Referring particularly to FIG. 12, it will be noted that the front element 214 does not extend to the sidewalls of the side spacers 212 and 212′ so that it thereby forms spaces 216 and 216′ to permit external travel of the reaches of the steering chain member 220.

The top and bottom plates 202 and 204 each have welded thereto a ring 222 and 224 respectively. The height of the rings 222 and 224 is so selected that a space between the pair of rings is maintained to receive the flange portion 226 of a sprocket generally designated by the numeral 228. The sprocket 228 has secured thereto a king pin 230 and a depending arm or dog 232 which corresponds to the dog 74 in the cast form of the invention shown for example in FIG. 6 of the drawings. Also, as more clearly shown in FIGS. 12 and 13, a stop block 236 is welded to the top plate 202 and a pair of stop plates 238 and 238′ are welded to the upper surface 240 of the sprocket 228. These elements 236, 238 and 238′ provide stop means for determining the limit of rotation of the sprocket 228 and in effect provide anti-jackknife means for a steerable trailer. Where desired the anti-jackknife means discussed in reference to FIGS. 10 and 11 may be used in conjunction with the form illustrated in FIGS. 12 and 13 whereby positive stops are provided at the forward and at the rearward ends of the trailer or at any of the intermediate axles which are to be steered.

Figure 6:
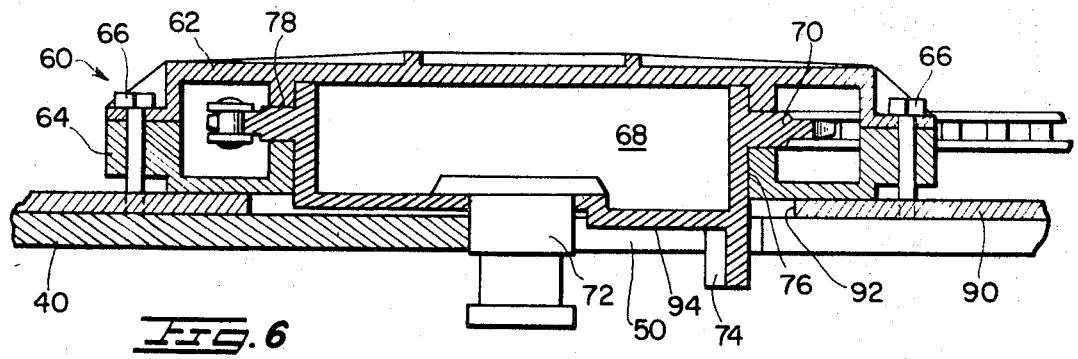
FIG. 6 is a section substantially on line 6—6 of FIG. 5.

The assembly shown in FIGS. 12 and 13 is welded or otherwise firmly secured to plate means carried by the frame of the trailer as hereinbefore discussed with reference to the form of the invention shown in FIGS. 4, 5 and 6.

As hereinbefore discussed, the steering mechanism for multiple wheeled trailers has been primarily disclosed with reference to a trailer having one fixed axle assembly and one steerable axle assembly. However, the principles of the invention may be advantageously applied to trailers having a plurality of steerable and for example at least one fixed wheeled axle assembly. The adaptability of the present system is clearly illustrated in FIGS. 14 and 15 wherein the trailer generally designated 300 includes a main frame 302. The trailer 300 is drawn by a tractor designated 304 having rear traction wheels 306. The trailer 300 includes a first wheeled steerable axle assembly 308, a fixed wheeled axle assembly 310 and a rear steerable axle assembly 312. The forward steerable axle assembly 308 is mounted on a platform 320 supported by a pair of bearing rings 322 and 324 constructed similar to that illustrated in FIGS. 10 and 11. The axle assembly is rotated by a shaft 326 mounted in a bearing sleeve 328 vertically supported by cover frame means 329. The upper end of the shaft 326 carries a pair of sprockets 330 and 333. The lower end of the shaft 326 has secured thereto a control arm 336 constructed, for example, as shown in FIGS. 10 and 11. Sprocket 333 is connected by a chain means 340 to a drive sprocket 342 formed as illustrated in, for example, FIGS. 12 and 13. Thus, the sprocket 342 is driven by the fifth wheel of the tractor and through the chain means 340 causing the steerable axle assembly 308 to move in the same direction as that of the tractor power wheels assembly 306. The sprocket 330 is connected to the rear axle assembly 312 via crossed chain means generally designated by numeral 350. The rearward end of the crossed chain means 350 is trained about a sprocket 144′ which corresponds to the sprocket 144 illustrated in FIGS. 10 and 11. The sprocket 144′ is secured to a shaft 142′ which in turn drives a control arm which may be of identical construction to that shown in FIGS. 10 and 11. Thus, as the tractor 304 turns to the left, the trailer front axle assembly 308 correspondingly turns to the left, the fixed axle 310 forms a pivot for the trailer and the rear axle assembly 312 turns to the right to provide a coordinated turn for a three axled trailer assembly as shown in broken lines in FIG. 14. The foregoing relationship may be extended to a plurality of axles greater than three whereby trailers of substantially any length can be towed without undue shearing forces on the tires of the wheeled axle assemblies.

Another form of multiple wheeled trailer assembly in relation with a towing tractor and having steerable axle assemblies that respond to the turning movements of the tractor is shown in FIGS. 16 to 24. Thus, as shown in FIG. 16, the tractor 360 is similar to the tractor 12 of FIGS. 1–3 and like the towing tractor 12, the tractor 360 has a similar fifth wheel assembly generally designated by the numeral 362. The trailer 364 is shown in the form of a tanker but such is merely illustrative. The trailer has a steerable front wheeled axle assembly 366, a center fixed wheeled axle assembly 368 and a rear wheeled steerable axle assembly 370 while the trailer has a front steerable wheel unit 372 and a rear fixed drive wheel unit 374.

The underside of the front end 376 of the trailer 364 carries a sprocket 378 and has a depending king pin 380 and a depending arm 382, with the pin 380 and the arm 382 corresponding to the king pin 72 and the arm 74 of the form of FIG. 4, for example, and being structurally associated with companion parts of the fifth wheel assembly 362 in the same manner as the king pin 72 and arm 74 are structurally related with the fifth wheel assembly 24 of FIGS. 1–4.

A chain 384 is entrained over the sprocket 378 and has its bnad end portions or reaches 386 guided over vertically disposed sheaves 388 whereby the band end portions leading to and from the front steerable axle assembly 366 are guided downwardly with the band end portions traveling under small guide pulleys 390 disposed vertically immediately in front of the axle assembly 366. In this way, the band end portions of the chain 384 that extends from the sprocket 378 to the front axle assembly 366 of the trailer are guidingly passed from a higher to a lower plane without interfering with the operation thereof in transmitting the rotary movements of the sprocket, under the inducements of the turning movements of the towing tractor 360, to the front steerable axle assembly 366 for the trailer 364.

The front steerable axle assembly 366 includes a supporting and mounting platform or turntable 390 from which axle supporting arms 392 depend to support the axle 394 carrying the wheels 396, such assembly being similar to that shown in FIG. 9. The turntable 390 is rotatably mounted by a head pin 398 to cross-arms fixed to the main side beams 402 of the trailer frame.

As shown in FIGS. 20 to 24, a pair of convergent arms 404 and 406 extend rearwardly from the turntable 390 and have their outer convergent ends connected by a yoke 408 which is pinned thereto. The center of the yoke 408 is formed with a journal 410 in which one end of a rod 412 is fitted, with the other end of the rod fixedly projecting from the platform and being disposed intermediate the arms 404 and 406, as shown in FIGS. 23 and 24.

A sleeve 414 is slidably circumposed on the rod 412 and is provided with an integral upstanding pin 416 that is rotatably fitted in a bearing lined sleeve 418. The sleeve 418 is fixed, as by welding, on one end of a control arm or crank 420 with the arm overlying the rod 412 and having its other end formed with a vertical opening 422 within which the lower end of a vertical shaft 424 is fixed by welding 426. The shaft 424 is rotatably housed in a vertical tubular housing 428 having a suitable bearing liner 430 engaging the shaft. The housing 428 is supported by cross frame members 432. The upper end of the shaft carries a sprocket 434 which is engaged by a chain 436 that has its ends fixed to the band end portions or reaches 386, a shown in FIG. 22.

A sprocket 438 is fixed on the shaft 424 below the sprocket 434 and immediately adjacent the upper end of the tubular housing 428 and one end of an endless chain 440 is entrained thereon. The reaches of the chain 440 are crossed as the chain is extended rearwardly and the other end of the chain 440 is entrained on a sprocket 442 which is carried by a shaft 424′ that is a part of the operating assembly for the rear steerable axle assembly 370. In this respect, the operating assembly for the axle assembly 370 is identical to that just described in connection with the front steerable axle assembly 366 with the same including the shaft 424′, control arm or crank 420′ connected in the same way as the arm 420 to the platform 390′ from which the wheel carrying axle 394′ for the rear steerable axle assembly is supported.

From a consideration of FIGS. 18 and 19, wherein the straight line and turning relation of the front and rear steerable axle assemblies 366 and 370 are schematically shown in association with the intermediate fixed center axle assembly 368, it can be understood that when the tractor and its fifth wheel unit 362 are turned, the chain 384 and its band extensions 386 will be activated so as to turn the sprocket 434 which will rotate the shaft 424. Such rotation of the shaft 424 will act on the turntable 390 through the control arm 420 and the rod 412 and also will rotate the sprocket 438. When the sprocket 438 is rotated, this will exert a pull on the crossed chain 440 and, since the reaches of the chain 440 are crossed, the sprocket 442 will be rotated in the opposite direction from the sprocket 424, thereby causing through the shaft 424′ and the arm 420′ and the rear axle assembly 370 to turn in the opposite direction from the front axle assembly 366, as clearly shown in FIG. 19.

The slide arrangement between the sleeves 414 and 414′ and the rods 412 and 412′, with the turning forces of the control arms 420 and 420′ being transmitted to the platforms or turntables 390 and 390′ through the arms, sleeves and rods, will act to prevent jack-knifing of the trailer in that the turning is controlled so that over-controlling of the axles is prevent in a way similar to the slide block 148 and slide 150 of FIG. 10.

In FIGS. 25 and 26, a self-centering means 444 is shown for enabling the steerable rear axle assembly 370 and front steerable axle assembly 366 to return to straight line tracking positions as the towing tractor straightens out from a turn. The self-centering means 444 includes a longitudinal torsion bar 446 having its rear end rotatably journalled in a bearing cup 448 mounted on a rear cross bar 450 between the side frame members 402. The torsion bar extends forwardly along the longitudinal center line of the trailer and is journalled adjacent its forward end in a bearing 452 mounted on a cross bar 454. The forward end of the torsion bar is provided with a depending segment gear 456 which is enmeshed with a spur gear 458 fixed on the upper end of a vertical stub shaft 460 that is rotatably housed in a housing 462 upstanding from the turntable 390′. A large sprocket 464 is fixedly circumposed on the shaft 460 and is connected by an endless chain 466 with a companion sprocket 468.

The sprocket 468 is part of the turning arm arrangement for the turntable 390′ in that it is carried by the shaft 470 for the crank arm 420′ with the crossed actuating chain 436 from the front steerable axle assembly 366 being entrained over the sprocket 442' on the shaft 470.

A somewhat similar arrangement is shown in FIG. 27, wherein parallel equalizer bars 472 and 474 extend longitudinally from the rear cross bar 450' with the bars having their rear ends attached by coil springs 476 to the bar 450'. The forward ends of the side by side bars are attached by pivot pins 478 to the sprocket 464' with the equalizer bars taking the place of the torsion bar 446 and the gearing 456 and 458. The forward ends of the bars 472 and 474 are pivoted on the upper face of the sprocket 464' on radially opposite sides of the center shaft 460' with the shaft 460' being connected by the chain 466' to the sprocket 468.

From the foregoing description it can be appreciated that all of the objects hereinbefore set forth are accomplished and it will be understood that various modifications may be made in the forms of the structures without departing from the spirit of the invention.

I claim:

1. A multiple wheeled tractor-trailer assembly wherein the front end of the trailer is pivotally connected by a king pin to a fifth wheel supported by the tractor and the tractor fifth wheel is of the type which has a generally V-shaped rearwardly opening king pin receiving slot, at least one wheeled steerable axle assembly supporting the trailer and including stop means to limit the radius of rotation thereof in a plane parallel to the plane of the trailer bed, means mounting the wheeled axle assembly for controlled pivotal movement relative to the trailer main frame, said mounting means including transverse frame means for the trailer, a vertical shaft rotatably mounted on the transverse frame means of the trailer for rotation relative thereto, said shaft having upper and lower end portions, a first sprocket secured to the upper end portion for rotation with the shaft, a control arm secured to the lower end portion of the shaft for rotation therewith, a slide arrangement connecting the control arm to the wheeled axle assembly and adapted to prevent overcontrolling of the axle assembly and serve as an antijacknifing means, a king pin carried at the forward end of the trailer, a second sprocket mounted concentric to the king pin, a depending arm secured to the second sprocket eccentric to the king pin and adapted to be snugly received in the fifth wheel slot rearwardly of the king pin, and chain means drivably inter-connecting the first and second sprockets.

2. The invention defined in claim 1 wherein the one wheeled axle assembly constitutes the rear axle of the trailer and the chain means drivably inter-connecting the first and second sprockets includes a chain having crossed over reaches.

3. The invention defined in claim 1 wherein the one wheeled axle assembly constitutes a forward axle assembly for the trailer and such axle assembly pivots in the same direction to the movement of the rear wheels of the tractor.

4. A multiple wheeled tractor-trailer assembly wherein the front end of the trailer is pivotally connected by a king pin to a fifth wheel supported by the tractor and the tractor fifth wheel is of the type which has a generally V-shaped rearwardly opening king pin receiving slot, a first wheeled axle assembly for the trailer, means mounting the first wheeled axle assembly for controlled pivotal movement relative to the trailer main frame, said mounting means including a vertical shaft mounted on the trailer frame for rotation relative thereto, a first sprocket secured to rotate with the shaft, a crank secured to rotate with the shaft, a slide secured to the wheeled axle assembly and adapted to receive the extended end of the crank, a king pin carried at the forward end of the trailer, a second sprocket mounted concentric to the king pin, a depending arm secured to the second sprocket eccentric to the king pin and adapted to be snugly received in the fifth wheel slot rearwardly of the king pin, first chain means drivably inter-connecting the first and second sprockets, a second wheeled axle assembly, means mounting the second wheeled axle assembly for controlled pivotal movement relative to the trailer main frame rearwardly of the first wheeled axle assembly, said mounting means including a second vertical shaft mounted on the trailer frame for relative rotation thereto, a third sprocket secured to rotate with the second vertical shaft, a second crank secured to rotate with the second vertical shaft, a second slide secured to the second wheeled axle assembly and adopted to receive the extended end of the second crank, a fourth sprocket secured to the vertical shaft mounting the first wheeled axle assembly and chain means drivably interconnecting the third and fourth sprockets.

5. The invention defined in claim 1 wherein the means mounting the wheeled axle assembly includes a pair of grooved races and ball means retained in said races.

6. In a multiple wheeled tractor-trailer assembly wherein the front end of the trailer is pivotally connected by a king pin to a fifth wheel supported by the tractor and the tractor fifth wheel is of the type having a generally V-shaped rearwardly opening king pin receiving slot and said trailer has parallel side frame members, the improvement comprising at least a forward and a rearward steerable wheeled axle assembly supporting the trailer, means mounting the axle assemblies to the trailer frame for controlled pivotal movement relative to the trailer frame, longitudinally spaced transverse frame means between the side frame members of the trailer, vertical shafts rotatably mounted on said transverse frame means and having upper and lower end portions, sprockets fixed on the upper end portions of the shafts for rotation therewith, a control arm fixedly carried by the lower end portion of each shaft for rotation therewith, said axle assemblies including rotatable turntables, a slide arrangement connecting the control arm of one shaft to an adjoining turntable, a chain means having crossed over reaches connecting the sprockets of the shafts, the shaft of the forward axle assembly having a further sprocket fixed on the upper end portion thereof, a king pin carried by the forward end of the trailer, a sprocket associated with said king pin and an arm secured to said last sprocket and adapted to be snugly received in the fifth wheel slot and chain means drivingly interconnecting the sprocket at the fifth wheel with the further sprocket on the shaft of the forward axle assembly.

7. The invention defined in claim 6 wherein said control arms of the forward and rearward axle assemblies are disposed horizontally in inwardly facing spaced relation longitudinally of the trailer frame and said turntables have slide means underlying the arms with the arms carrying interengaging slide elements complemental to and received by the slide means.

8. The invention of claim 6 wherein self centering means is structurally associated with the axle assemblies.

9. A multiple wheeled tractor-trailer assembly wherein the front end of the trailer is pivotally connected by a king pin to a fifth wheel supported by the tractor and the tractor fifth wheel is of the type which has a generally V-shaped rearwardly opening king pin receiving slot, at least one wheeled steerable axle assembly supporting the tralier, means mounting the wheeled axle assembly for controlled piovtal movement relative to the trailer main frame, said mounting means including transverse frame means for the trailer, a vertical shaft rotatably mounted on the transverse frame means of the trailer for rotation relative thereto, said shaft having upper and lower end portions, a first sprocket secured to the upper end portion for rotation with the shaft and including radius of turn limiting means associated therewith, a control arm secured to the lower end portion of the shaft for rotation therewith, a slide arrangement connecting the control arm to the wheeled axle assembly and adapted to prevent overcontrolling of the axle assembly and serve as an antijackknifing means, a king pin carried at the forward end of the trailer, a second sprocket mounted concentric to the king pin, a depending arm secured to the second sprocket eccentric to the king pin and adapted to be snugly received in the fifth wheel slot rearwardly of the king pin, and chain means drivably inter-connecting the first and second sprockets.

References Cited

UNITED STATES PATENTS

| | | | |
|---|---|---|---|
| 1,782,265 | 11/1930 | Haase | 280—100 |
| 1,929,050 | 10/1933 | Bender | 280—433X |
| 2,764,424 | 9/1956 | Standing | 280—426 |
| 3,195,922 | 7/1965 | Humes | 280—426 |

FOREIGN PATENTS 558,143 2/1957 Italy.

LEO RIAGLIA, Primary Examiner

U.S. Cl. X.R.

280—100